(12) United States Patent
Pfeiffer

(10) Patent No.: US 8,141,580 B2
(45) Date of Patent: Mar. 27, 2012

(54) PRESSURE REDUCER

(75) Inventor: Uwe Pfeiffer, Elztal (DE)

(73) Assignee: Honeywell Technologies SARL, Morges (CH)

( * ) Notice: Subject to any disclaimer, the term of this patent is extended or adjusted under 35 U.S.C. 154(b) by 627 days.

(21) Appl. No.: 12/277,419

(22) Filed: Nov. 25, 2008

(65) Prior Publication Data

US 2009/0145495 A1 Jun. 11, 2009

(30) Foreign Application Priority Data

Dec. 7, 2007 (DE) .................. 10 2007 059 315

(51) Int. Cl.
*F16K 31/12* (2006.01)
*F16K 31/36* (2006.01)

(52) U.S. Cl. .................. 137/505.18; 137/505.38

(58) Field of Classification Search ......... 137/505.38, 137/511, 528, 535, 536, 537, 538, 540, 505.18, 137/625.3, 505.13; 251/120
See application file for complete search history.

(56) References Cited

U.S. PATENT DOCUMENTS

| | | | | |
|---|---|---|---|---|
| 3,643,683 A * | 2/1972 | Semon | ...................... | 137/505.18 |
| 3,777,777 A * | 12/1973 | Katchka | ...................... | 137/505.18 |
| 3,825,225 A * | 7/1974 | Demi | ...................... | 137/505.18 |
| 3,890,997 A * | 6/1975 | Dresler | ...................... | 137/505.18 |
| 4,276,902 A * | 7/1981 | Roth | ...................... | 137/505.18 |
| 4,314,582 A * | 2/1982 | Drori | ...................... | 137/505.18 |
| 4,541,454 A * | 9/1985 | Sturman et al. | ......... | 137/505.41 |
| 4,760,866 A * | 8/1988 | Adler | ...................... | 137/505.18 |
| 6,986,338 B2 * | 1/2006 | Gotthelf | ...................... | 123/460 |
| 2006/0138378 A1 * | 6/2006 | Kay | ...................... | 251/339 |

FOREIGN PATENT DOCUMENTS

| | | |
|---|---|---|
| DE | 3641792 A1 | 6/1987 |
| GB | 2185090 A * | 7/1987 |

OTHER PUBLICATIONS

German Search Report, Deutsches Patent-und Markenamt, Dated Dec. 8, 2008.

* cited by examiner

*Primary Examiner* — John Fox
*Assistant Examiner* — Seth Faulb
(74) *Attorney, Agent, or Firm* — Norris McLaughlin & Marcus, PA; Christa Hildebrand, Esq.

(57) ABSTRACT

A pressure reducer for fluid lines, with a sealing piston (70, 110) as stop element, with an equalization piston (20a, 190) as a means for pressure equalization, with a single-part or multi-part connecting means (20b, 90, 200) by which the sealing piston (70, 110) and the equalization piston (20a, 190) are rigidly connected with one another, with a valve seat, in conjunction of which the sealing piston (70, 110) defines a flow-through opening, against which the sealing piston (17, 110) seals when the valve is closed and which the connecting means (20b, 90, 200) penetrates, and with guide means (20c, 210) which are directly or indirectly rigidly coupled with the connecting means and guide an arrangement composed of at least the equalization piston (20a, 190), connecting means (20b, 90, 200) and sealing piston (70, 110) in each operating position, wherein the guide means (20c, 210) are arranged in the region of the valve seat between the sealing piston (70, 110) and the equalization piston (20a, 190).

18 Claims, 6 Drawing Sheets

PRESSURE REDUCER

CROSS-REFERENCE TO RELATED APPLICATIONS

Figure 1:
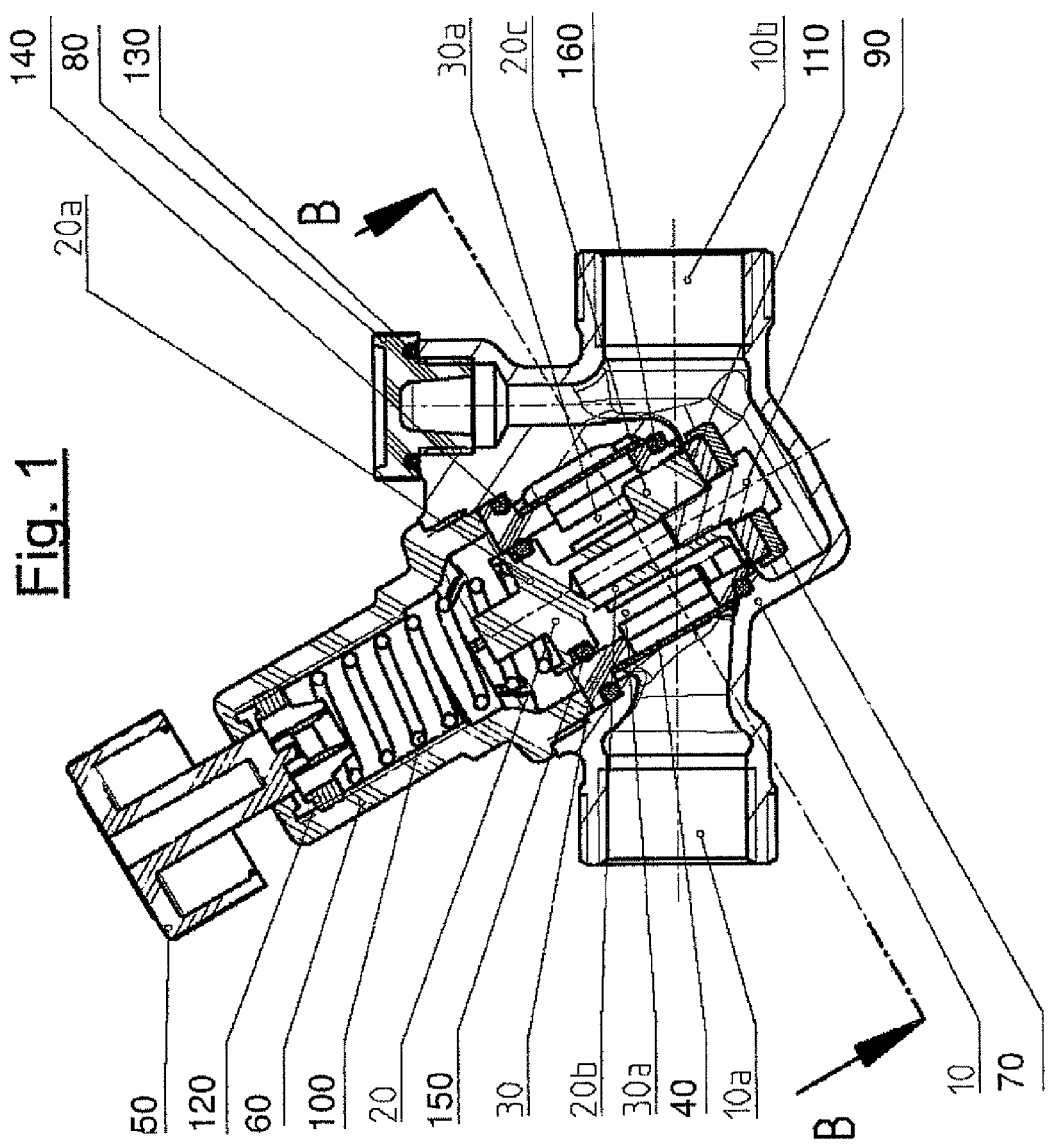

This application claims priority to DE 10 2007 059 315.7 filed on Dec. 7, 2007.

BACKGROUND OF THE INVENTION

The present invention relates to a pressure reducer, in particular for fluid lines, for example water pipes, with a sealing piston as a stop element, an equalization piston as means for pressure equalization, a one-part or multipart connecting means which rigidly connects the sealing piston and the equalization piston, with a valve seat which in conjunction with the sealing piston defines a flow-through opening against which the sealing piston seals when the valve is closed and which extends through the connecting means at least in an open position of the pressure reducer, and with guide means which are in directly or directly connected with the connecting means and which guide an arrangement consisting at least of equalization piston, connecting means and sealing piston in any operating position.

The document with the publication of number DE 195 39 239 A1 discloses a pressure reducer having the afore-described features. This pressure reducer has a very complex design. It has in addition to an inlet port and an outlet port two additional ports which are used for receiving the components required for pressure regulation. The pressure reducer has a significant installation height compared to other types of fittings. Moreover, the pressure transducer requires a special housing.

The applicant has commercially introduced another pressure reducer known as type "D05F". The type "D05F" pressure reducer is much more compact. In addition to the inlet port and the outlet port, only one additional port is provided, in which the components of the pressure reducer required for regulating the pressure are inserted. The housing can be also used for other fittings if other components need to be inserted in the housing. The type "D05F" pressure reducer has most of the features described above. For guiding the arrangement consisting of equalization piston, connecting means and sealing piston, a funnel is provided as guide means, which is fixedly attached to the housing in the region of the equalization piston and extends in the direction toward the sealing piston or the valve seat, respectively. The funnel is penetrated by the connecting means. The free end of the funnel contacts and guides the connecting means. The funnel therefore operates as guide means for the arrangement consisting of equalization piston, connecting means and sealing piston. This type of guiding is generally sufficient to ensure a reliable operation of the type "D05F" pressure reducer. However, the funnel must have adequate stiffness so as to be able to hold the arrangement consisting of equalization piston, connecting means and sealing piston also under a strong flow and large forces acting on the arrangement.

In view of the state-of-the-art, it is an object of the invention to propose a simple and compact pressure reducer, which allows the arrangement consisting of sealing piston, equalization piston, and connecting means to be easily guided.

BRIEF SUMMARY OF THE INVENTION

The object is attained with the invention in that the guide means are arranged in the region of the valve seat between the sealing piston and the equalization piston.

Arranging the guide means according to the invention in the region of the valve seat between the sealing pistons and the equalization piston enables, on one hand, optimal guiding of the arrangement consisting of equalization piston, connecting means and sealing piston and, on the other hand, a compact construction of the pressure reducer. The arrangement need not be guided by the guide means, which are arranged beyond the sealing piston in relation to the equalization piston, thereby realizing a compact design. In addition, the arrangement is guided in the region of its respective ends, so that torque acting on the arrangement can be effectively eliminated.

According to the invention, the guide means may be wings which protrude radially from the connecting means.

In an open operating position of the pressure reducer, the guide means extend through the valve seat and are preferably guided for movement through, and make contact with, the valve seat and the region immediately abutting the valve seat.

The equalization piston, parts of the connecting means and the guide means may be formed as a single part, preferably a plastic part. The plastic part may be an injection molded plastic part.

The connecting means of a pressure reducer according to the invention may have a spindle which is screwed into the equalization piston and the sealing piston. The connecting means may include a screw for attaching the sealing piston to the component.

The guide means are preferably clamped between the sealing piston and the spindle.

A pressure reducer according to the invention may include a sleeve, in which the arrangement composed of the sealing piston, the guide means, the connecting means and the equalization piston are moveably arranged. The sleeve may be made of plastic.

The valve seat may be formed on a first end of the sleeve, with the sealing piston cooperating with the valve seat for adjusting the flow through the pressure reducer and thereby the back pressure.

In a pressure reducer according to the invention, the guide means may guidedly abut a first region of an inner wall of the sleeve adjoining the first end. Moreover, the equalization piston may guidedly abut a second region of an inner wall of the sleeve adjoining a second end of the sleeve. In this way, the respective ends of the arrangement consisting of sealing piston, guide means, connecting means and equalization piston can be guided through the sleeve.

The first region or the valve seat and the second region preferably have the same diameter. In this way, a pressure-compensated device can be obtained, which operates under static conditions, i.e., when the pressure reducer is closed. Under static conditions, the forces operating on the arrangement compensate each other at the preset pressure, so that only the forces caused by the back pressure operate on the arrangement in the closing direction and the forces produced by a spring in the opening direction.

The wall of the sleeve may have through openings in a third region of the wall disposed between the first and the second region, through which the fluid flows when the pressure reducer is in an open position.

Advantageously, the pressure reducer according to the invention includes a housing, in which the sleeve as well as the arrangement composed of the sealing piston, the guide means, the connecting means and the equalization piston are arranged.

The arrangement composed of sealing piston, guide means, connecting means and equalization piston may be urged by the aforementioned spring into an open operating position. With a sufficiently large back pressure, the forces acting on the arrangement produced by the back pressure oppose the spring force and urge the arrangement, in particular the sealing piston, against the valve seat in a closed position.

The bias force of the spring can be adjusted for setting the back pressure at which the pressure reducer closes.

In a particular embodiment, the pressure reducer may include a means for rejecting suspended matter arranged on the inflow side upstream of the equalization piston. The means for rejecting suspended matter may be a funnel-shaped screen which is penetrated by the connecting means. The screen may include nozzles, which cause suspended material to be suctioned out of the region upstream of the equalization piston. The edge of the screen may be snapped into a groove disposed on the inside of the sleeve.

Two exemplary embodiments of the pressure reducer of the invention will be described in more detail with reference to the drawings, which show in:

BRIEF DESCRIPTION OF THE SEVERAL VIEWS OF THE DRAWING(S)

Figure 2:
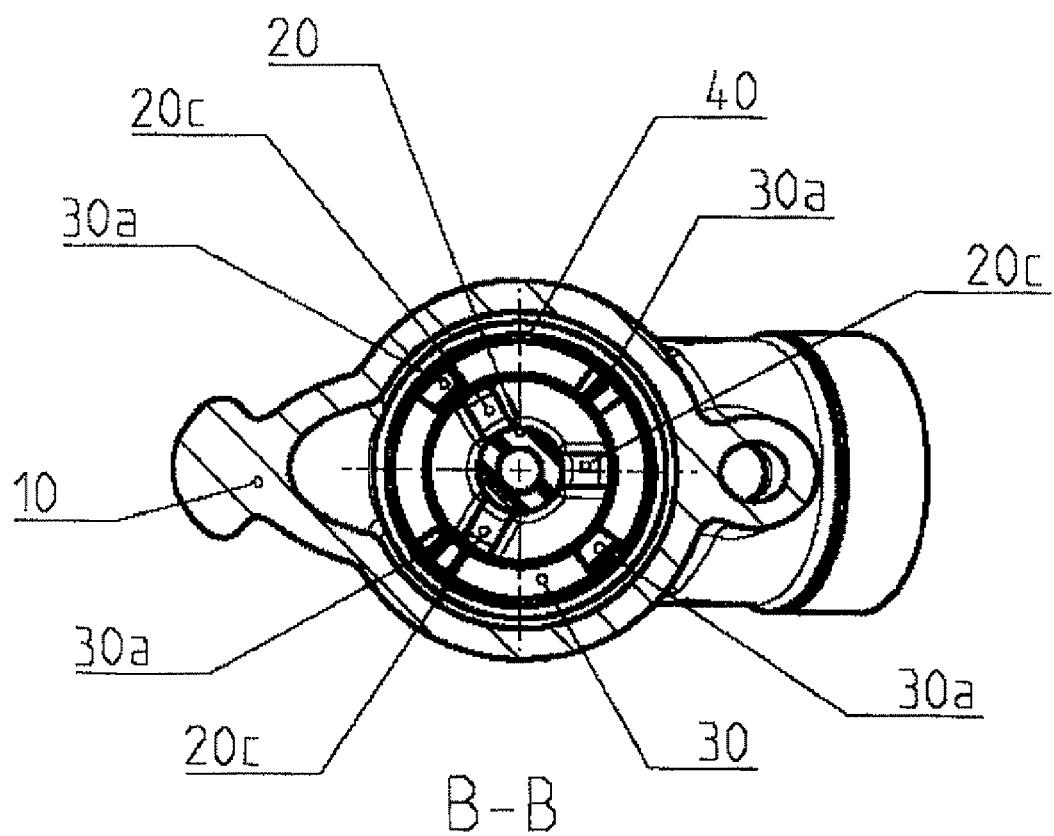
Figure 3:
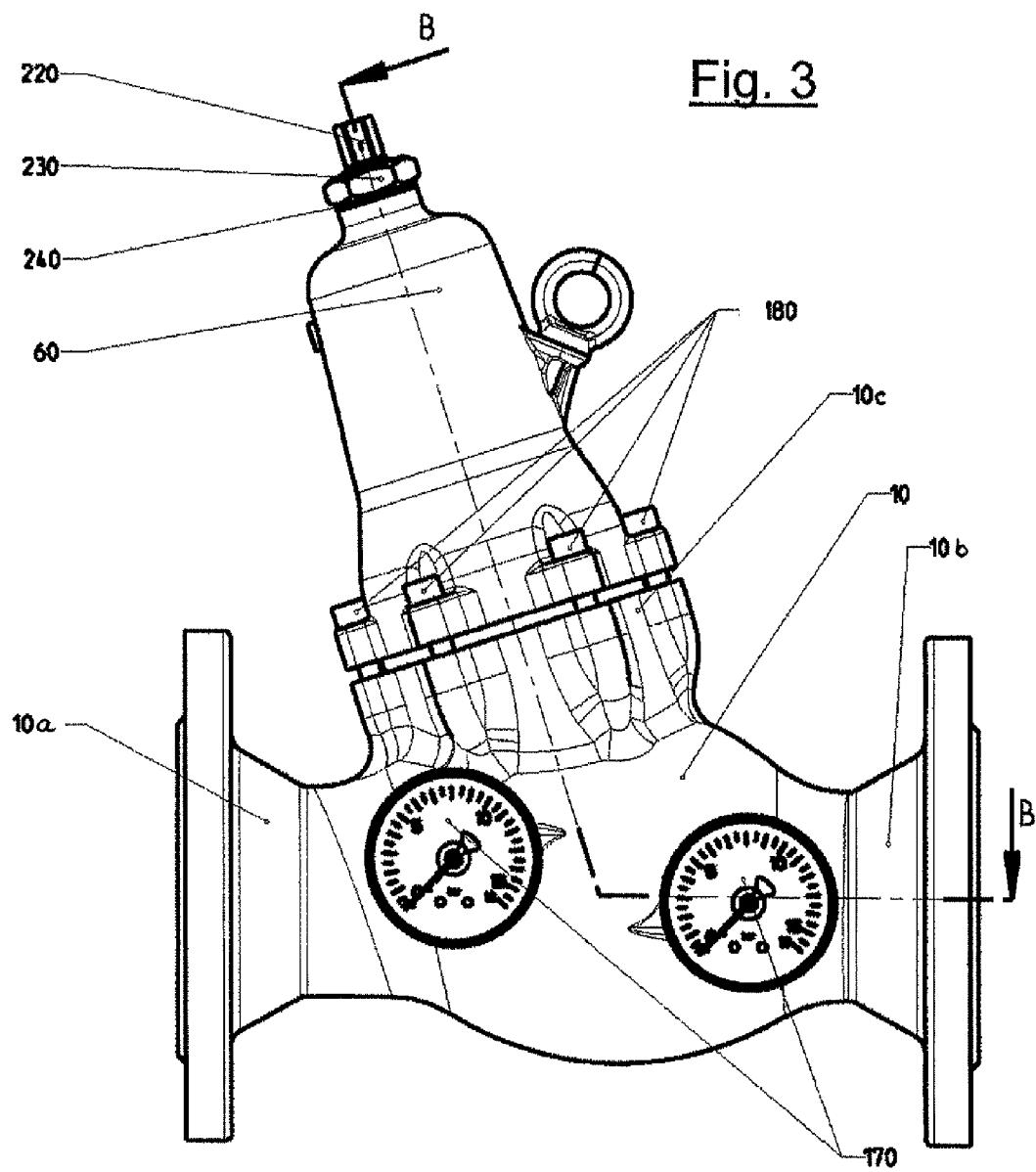
Figure 4:
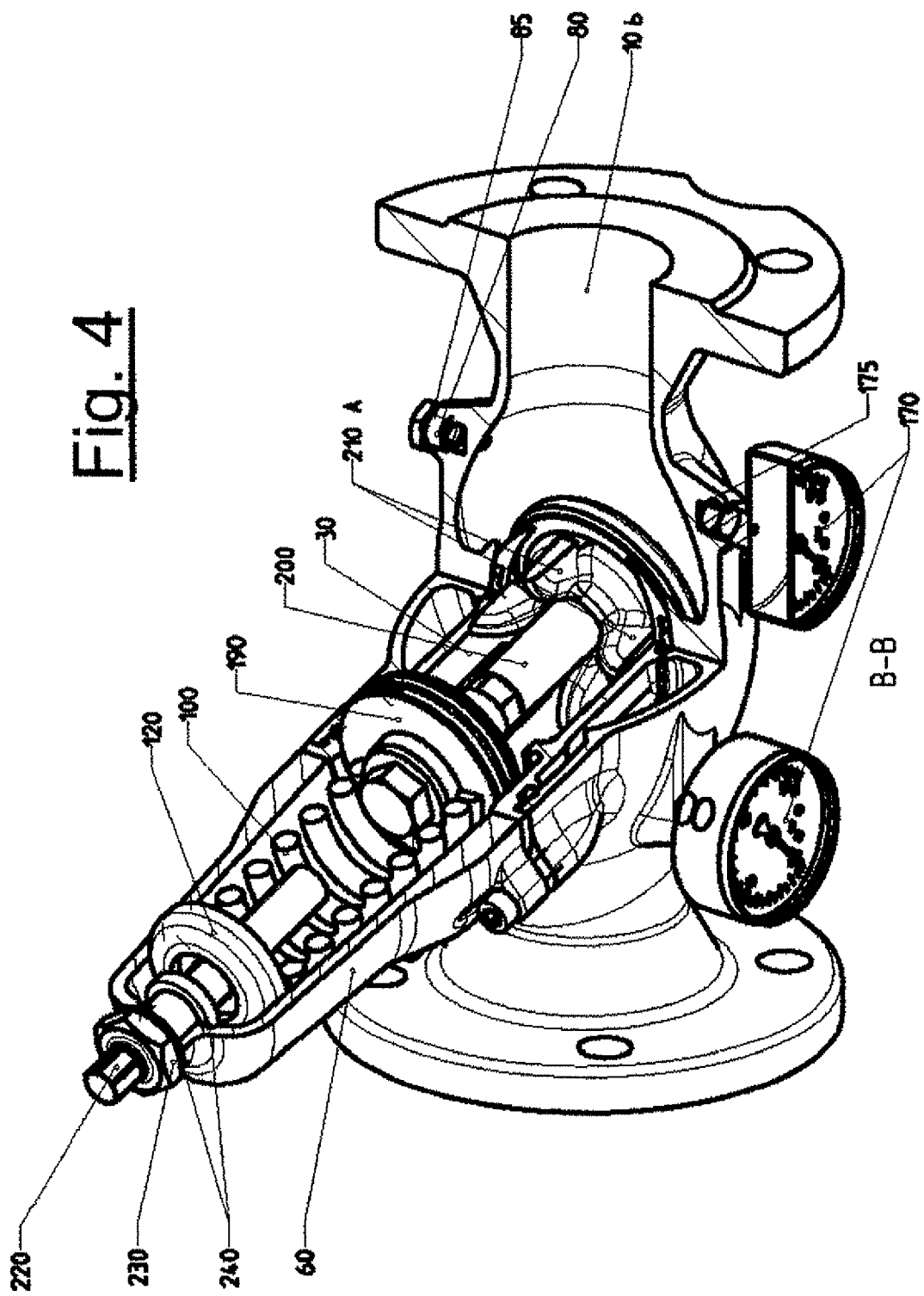
Figure 5:
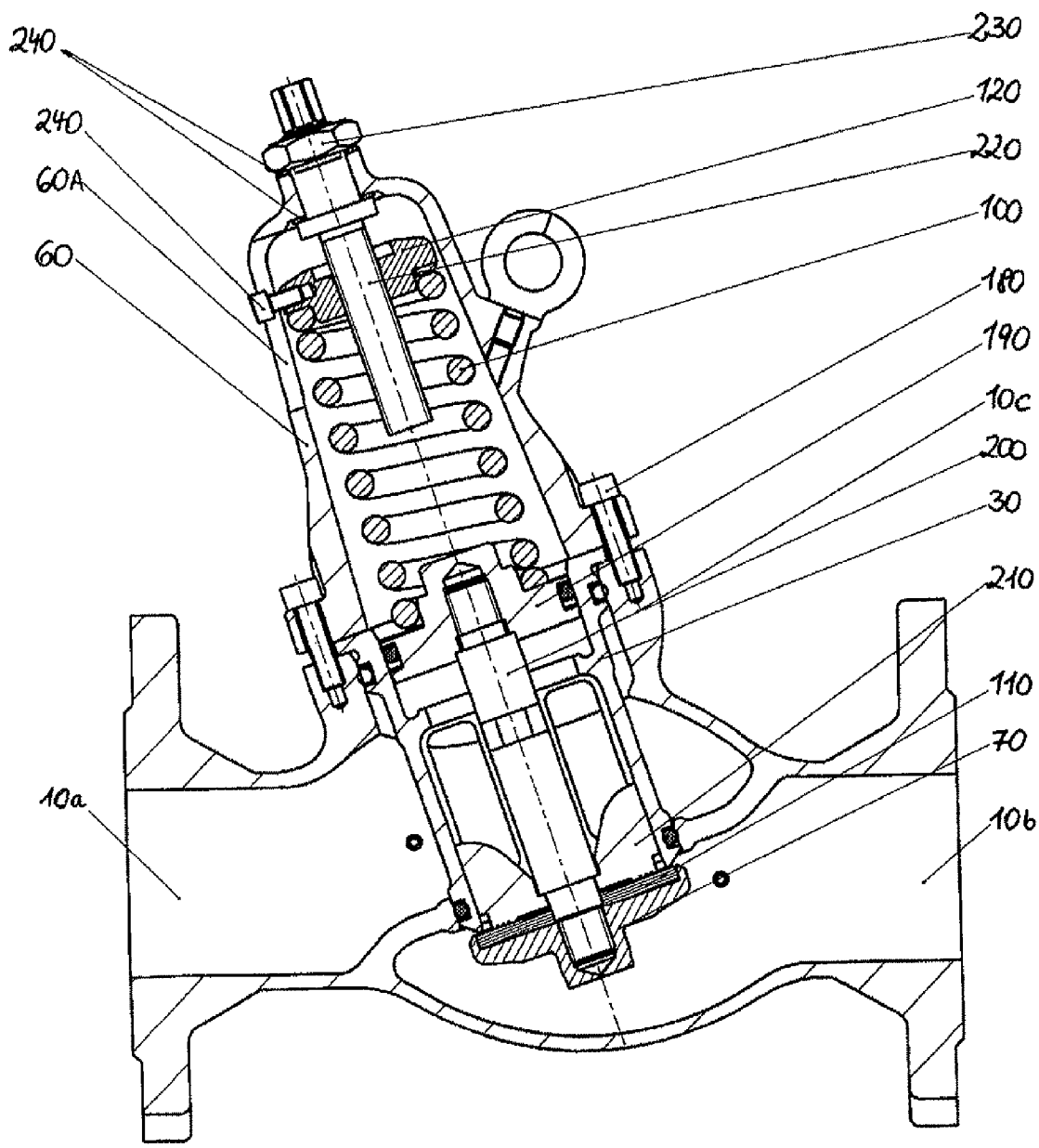
Figure 6:
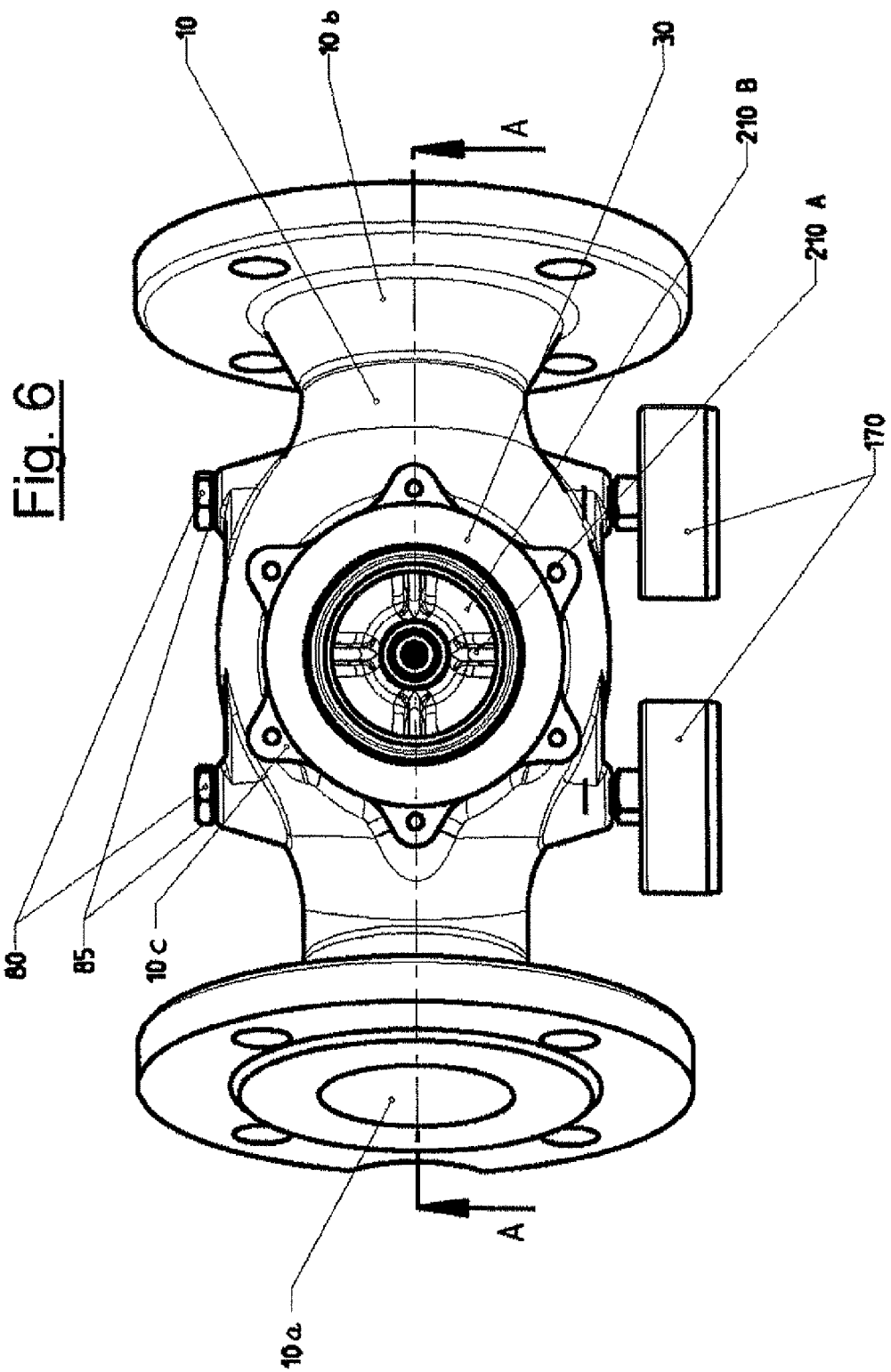

FIG. 1 a longitudinal cross-section through a first exemplary embodiment,

FIG. 2 a cross-section through the first exemplary embodiment taken along the line B-B in FIG. 1, FIG. 3 a side view of a second exemplary embodiment, FIG. 4 a perspective diagram of the second exemplary embodiment in a partial cross-section, FIG. 5 a longitudinal cross-section taken along the line A-A in FIG. 6 through the second exemplary embodiment, and FIG. 6 a top view of the second exemplary embodiment with individual components partially removed.

DETAILED DESCRIPTION OF THE INVENTION

The first exemplary embodiment of a pressure reducer according to the invention has a housing 10, which is implemented as a slanted seat housing with an inlet port 10a and an outlet port 10b. The outlet port 10b includes a connection for a pressure gauge which is closed with a cover 80. A seal 130 is inserted between the cover 80 and the housing 10.

A valve insert is inserted in the housing 10, or more specifically in an connecting socket 10c of the housing, with the valve insert composed of the parts indicated with the reference symbols 2 to 70, 90 to 120, and 140 to 160.

The valve insert includes a sleeve 30. The sleeve 30 has on a first end a tapered edge forming a valve seat of the pressure reducer. This valve seat engages in an opening in the flow path between the inlet port 10a and the outlet port 10b. The sleeve 30 is supported on the housing by a shoulder in the region of the opening and is sealed in this region against the housing by a seal 160.

A circumferential shoulder supporting the sleeve in the connecting socket 10c is formed on a second end of the sleeve 30 opposite the first end, wherein a seal 140 is inserted between the sleeve 30 and the housing 10 in the region of the shoulder. The sleeve has a central third region located between the first region abutting the first end and the second region abutting the second end. The third region has longitudinal slits which extend parallel to the longitudinal axis of the sleeve and are delimited by ribs 30a connecting the first region and the second region. These longitudinal slits enable fluid to enter the interior of the sleeve 30 from the inlet port 10a and to exit the sleeve 30 in the direction of the first end, thereby reaching the outlet port 10b of the housing 10.

A circumferential groove is milled in the region of the housing surrounding the center region of the sleeve 30, so that the incoming fluid flowing through the inlet port 10a can flow around the sleeve 30 on all sides and enter the sleeve 30 through the longitudinal slits.

The longitudinal slits in sleeve 30 can be covered by a likewise sleeve-like or hollow-cylindrical sieve 40, which prevents larger particles from passing through the pressure reducer.

The inside diameter of the second region of the sleeve 30 is identical to the inside diameter of the sleeve 30 in the region of the valve seat. In this way, a pressure reducer can be realized, which is pressure-equalized under static conditions, i.e., without flow, and is therefore independent of the upstream pressure and pressure variations on the upstream side, which will be described in more detail below.

The sleeve is movably inserted into an arrangement which is composed of a plastic part 20, a screw 90, a disk 70, a sealing disk 110, and a seal 150. The parts of this arrangement are rigidly connected with one another.

The plastic part 20 extends over almost the entire length of the sleeve 30. In the first region of the sleeve 30, the plastic part 20 has wings 20 abutting the inner wall of the sleeve 30. Conversely, on the opposite end of the plastic part 20, a piston 20a is formed which sealingly contacts with the interposed seal 150 the inner wall in the second region of the sleeve 30. The wings 20c, which extend radially from a hollow-cylindrical section 20b of the plastic part 20, are fixedly connected to the piston 20a by this hollow-cylindrical section 20b. The plastic part 20 is guided in the sleeve 30 by the piston 20a and the wings 20c.

The piston 20a of the plastic part 20 forms an equalization piston whose additional function will now be described in detail. The hollow-cylindrical section 20b is part of a connecting means, which connects the equalization piston 20a with the wings 20c, which form guide means 20c.

The screw 90, which is screwed into the hollow-cylindrical section and holds the disk 70 and the sealing disk 110 with the plastic part 20, forms another part of the connecting means.

The combination of sealing disk 110 and disk 70 forms a sealing piston 20, 110 of the pressure reducer. The sealing piston 70, 110 is fixedly connected with the equalization piston 20a by the screw 90 and the hollow-cylindrical section 20b, which forms a connecting means. The diameter of the sealing disk 110 is greater than the diameter of the sleeve 30 in the region of the valve seat, so that flow through the pressure reducer is prevented when the sealing disk 110—and hence the sealing piston 70, 110—contact the valve seat. FIG. 1 illustrates the pressure reducer in this position.

However, if the entire arrangement 20, 90, 70, 110 is displaced and the sealing piston 70, 110 moves away from the valve seat, then the pressure reducer opens, allowing flow from the inlet port 10a to the outlet port 10b.

The pressure for opening the pressure reducer is typically produced by a compression spring 100 supported on the equalization piston 20a.

The sleeve 30 is inserted into the housing 10 of the pressure reducer and is held in the housing by a cap 60. The cap 60 has in one section an exterior thread, which is screwed into a corresponding interior thread in the connecting socket 10c of the housing 10. The cap 60 has also an interior thread, in which a threaded piece 120 is screwed. The end of the compression spring facing away from the equalization piston 20a is supported on of this threaded piece 120.

The threaded piece 120 is fixedly connected with a wing nut 50 which extends through a front opening of the cap 60. The spacing between the threaded piece 120 and the equalization piston 20a can be changed by a rotating the wing nut 50, thereby changing the bias force of the compression spring 100.

When the pressure reducer is closed, the sealing disk 110 contacts the valve seat. The free surface of the sealing disk 110, and hence of the sealing piston 70, 110, is subjected to the upstream pressure. The surface of the equalization piston 20a facing the sealing piston 70 is also subjected to the upstream pressure. Due to the identical diameter of the sleeve 30 in the region of the valve seat and in the second region, i.e., in the region of the equalization piston 20a, the forces acting on the arrangement consisting of the plastic part 20, the screw 90, the disk 70 and the sealing disk 110 produced by the upstream pressure are identical. However, the forces have different, i.e., opposite directions. The forces therefore cancel each other and the upstream pressure overall does not exert a force on the arrangement 20, 90, 70, 110. The pressure reducer is therefore independent of the upstream pressure in the closed position.

The second exemplary embodiment of the pressure reducer of the invention depicted in FIGS. 3 to 6 is different in that the second exemplary embodiment is configured for larger volumes flows and hence has a larger nominal diameter. The connection fittings of valves with a large nominal diameter are typically not implemented as threaded fittings, but as flange fittings, which can be flanged to incoming or connecting pipes.

A special fitting for connecting a pressure gauge can be omitted, and replaced by bores disposed in the housing 10 of the second exemplary embodiment, which are either closed with a cover 80, or into which the pressure gauges 70 are screwed. The housing 10 of the second exemplary embodiment is also implemented as a slanted seat housing, in which the additional components (valve insert) of the pressure reducer are inserted. These additional parts are held in the housing 10 by the cap 60, wherein in this exemplary embodiment the cap 60 is not screwed into the housing, but rather attached to a flange on the housing 10 with screws 180.

A sleeve 30 is first inserted in the housing 10, wherein the sleeve 30 has the same function as a sleeve 30 in the first exemplary embodiment. A valve seat is formed on the first lower end of the sleeve 30, wherein the diameter in the region of the valve seat is identical to the diameter of the sleeve 30 on the opposite end, in the region where an equalization piston 190 is movably arranged.

Whereas in the first exemplary embodiment the pressure equalization piston, a part of the connecting means and the guide means are fabricated from a plastic part 20, the equalization piston 190, the connecting means 200 and the guide means 210 in the larger pressure reducer illustrated in FIGS. 3 to 6 are assembled from separate parts.

The connecting means 200 is formed by a spindle which has an exterior thread on both ends. The exterior threads are, on one hand, screwed into the aforementioned equalization piston and, on the other hand, into a disk 70 which together with a sealing disk 110 forms the sealing piston 17, 110 of the pressure reducer.

The guide means 210 have wings 210A which are attached to a disk 210B. This ring 210B is placed on the end of the spindle 200 facing the sealing piston and clamped to the spindle 200 with the disk 70.

Because the sleeve 30 has the same diameter in the region of the valve seat as in the region of the equalization piston 190, the pressure in the pressure reducer of the second exemplary embodiment is also equalized, i.e., is in the closed position independent of the upstream pressure or of variations in upstream pressure. In the closed position, only the back pressure operates on the arrangements composed of the sealing cylinder 70, 110, the spindle 200 and the equalization piston 190. If the back pressure increases above the preset value, the pressure reducer closes. Conversely, if the back pressure drops below the preset pressure, the compression spring 100 pushes the arrangement composed of the equalization piston 190, the spindle 200 and the sealing piston 70, 110 and also the guide means 210 away from the valve seat, thereby opening the pressure reducer.

The back pressure, at which the pressure reducer opens or closes, can be adjusted by moving the threaded piece 120. However, the construction of this threaded piece is different from the threaded piece described above with reference to the first exemplary embodiment. It has a threaded bore, in which a threaded rod 220 is inserted. This threaded rod extends through the front face of the cap and is provided with a head 230 which includes engaging surfaces for engagement with wrenches. By rotating the head 230 and thereby also the threaded rod 220, the threaded piece 220 is axially displaced, because it is prevented from co-rotating by a headless screw 240 which is guided in a slot 60A. The headless screw 240 can be used to indicate the preset pressure of the pressure reducer.

The invention claimed is:

1. A pressure reducer for fluid lines, comprising
a sealing piston (70, 110) as stop element, with an equalization piston (20a, 190) for pressure equalization, having a single-part or multi-part connecting means (20b, 90, 200) by which the sealing piston (70, 110) and the equalization piston (20a, 190) are rigidly connected with one another,
with a valve seat, in conjunction of which the sealing piston (70, 110) defines a flow-through opening, against which the sealing piston (70, 110) seals when the valve is closed, and which the connecting means (20b, 90, 200) penetrates, and with guide means (20c, 210) which are directly or indirectly rigidly coupled with the connecting means and guide an arrangement composed of at least the equalization piston (20a, 190), connecting means (20b, 90, 200) and sealing piston (70, 110) in each operating position,
wherein the guide means (20c, 210) are arranged in the region of the valve seat between the sealing piston (70, 110) and the equalization piston (20a, 190);
wherein the connecting means comprises a spindle (200), which is screwed into the equalization piston (190) and the sealing piston (70, 110);
wherein the guide means (210) are clamped between the sealing piston and the spindle (200).

2. The pressure reducer according to claim 1, wherein the guide means (20, 210) are wings which protrude radially from the connecting means (20b, 90, 200).

3. The pressure reducer according to claim 1, wherein the guide means (20, 210) extend through the valve seat in an operating position.

4. The pressure reducer according to claim 1, wherein the equalization piston (20a), parts (20c) of the connecting means and the guide means (20c) are formed as one part (20).

5. The pressure reducer according to claim 1, wherein the pressure reducer comprises a sleeve (30), in which the arrangement of the sealing piston (70, 110), the guide means (20c, 210), the connecting means (20c, 90, 200) and the equalization piston (20a, 190) are arranged.

6. The pressure reducer according to claim 5, wherein the valve seat is formed on a first end of the sleeve (30).

7. The pressure reducer according to claim 5, wherein the guide means (20c, 210) guidedly contacts a first region of an inner wall of the sleeve (30) which abuts the first end.

8. The pressure reducer according to claim 1, wherein the equalization piston (20a, 190) guidedly contacts a second region of an inner wall of the sleeve (30) which abuts a second end of the sleeve (30).

9. The pressure reducer according to claim 8, wherein the first region of the valve seat and the second region have about the same diameter.

10. The pressure reducer according to claim 5, wherein the wall of the sleeve (30) comprises through openings in a third region of the wall between the first and the second region.

11. The pressure reducer according to claim 9, wherein the pressure reducer comprises a housing (10), in which the sleeve (30) as well as the arrangement composed of the sealing piston (70, 110), the guide means (20c, 210), the connecting means (20b, 90, 200) and the equalization piston (20a, 190) are arranged.

12. The pressure reducer according to claim 5, wherein the arrangement is urged by a spring (100) into an open operating position.

13. The pressure reducer according to claim 12, wherein a bias force of the spring (100) is capable of being adjusted.

14. The pressure reducer according to claim 1, wherein the pressure reducer comprises means for rejecting suspended matter, which is arranged on the inflow side upstream of the equalization piston.

15. The pressure reducer according to claim 14, wherein the means for rejecting suspended matter is a funnel-shaped screen which is penetrated by the connecting means.

16. The pressure reducer according to claim 15, wherein the screen comprises nozzles.

17. The pressure reducer according to claim 4, wherein the one part is formed of plastic.

18. The pressure reducer according to claim 10, wherein the through openings are formed as longitudinal slits.

* * * * *